United States Patent [19]

Ebersole

[11] Patent Number: 4,939,724
[45] Date of Patent: Jul. 3, 1990

[54] CLUSTER LINK INTERFACE FOR A LOCAL AREA NETWORK

[75] Inventor: Ronald J. Ebersole, Beaverton, Oreg.

[73] Assignee: Intel Corporation, Santa Clara, Calif.

[21] Appl. No.: 291,756

[22] Filed: Dec. 29, 1988

[51] Int. Cl.$^5$ .............................................. H04J 3/26
[52] U.S. Cl. .................................. 370/85.15; 370/94.1
[58] Field of Search ...................... 370/94, 60, 85, 86, 370/89

[56] References Cited

U.S. PATENT DOCUMENTS

| | | | |
|---|---|---|---|
| 4,554,659 | 11/1985 | Blood et al. | 370/88 |
| 4,716,575 | 12/1987 | Douros et al. | 370/86 |
| 4,755,991 | 7/1988 | Göertz | 370/86 |
| 4,782,485 | 11/1988 | Gollub | 370/94 |
| 4,802,161 | 1/1989 | Byars et al. | 370/94 |
| 4,823,312 | 4/1989 | Michael et al. | 370/84 |

Primary Examiner—Douglas W. Olms
Assistant Examiner—Min Jung
Attorney, Agent, or Firm—Owen L. Lamb

[57] ABSTRACT

A link (19) connects a first controller (6) and a second controller (10) in a local area network. The second controller sends a header to the first controller (6) containing status information as to the status of an input buffer (70) at the second controller. The flow of the message data from a first buffer (44) at the first controller is controlled depending upon the status of the input buffer (70) at the second node. This prevents overflow of the input buffer (70) by controlling the rate at which new messages are placed on the transmit data link (19).

10 Claims, 3 Drawing Sheets

FIG.1

FIG.3 PACKET HEADER

FIG.4 CLUSTER NETWORK HEADER

FIG.5 INDIVIDAL LOCAL ADDRESS FORMAT

FIG.6 GROUP LOCAL ADDRESS FORMAT

CLUSTER LINK INTERFACE FOR A LOCAL AREA NETWORK

CROSS REFERENCE TO RELATED APPLICATIONS

This application is related to copending patent applications "Local Area Network Having an Active Star Topology" Ser. No. 07/291,700 of Ronald Ebersole, et al.; "Ring Bus Hub for a Star Local Area Network" Ser. No. 07/291,594 of Ronald Ebersole, and "Node Controller for a Local Area Network" Ser. No. 07/291,640 of Ronald Ebersole, all filed concurrently herewith and assigned to Intel Corporation.

BACKGROUND OF THE INVENTION

1. Field of the Invention

The invention relates to data processing systems and more particularly to a method and apparatus for connecting a workstation to a local area network over a media link.

2. Description of the Related Art

A Local Area Network, or LAN, is a data communications system which allows a number of independent devices to communicate with each other within a moderately-sized geographical area. The term LAN is used to describe networks in which most of the processing tasks are performed by a workstation such as a personal computer rather than by the shared resources.

A LAN consists of a desktop workstation which performs processing tasks and serves as the user's interface to the network, wiring system which connects the workstations together, and a software operating system which handles the execution of tasks on the network.

The physical line which connects the components of a LAN, is called the network medium. The most commonly used media are wire, cable, and fiber optics. Coaxial cable is the traditional LAN medium and is used by Ethernet ™, the most widely recognized standard. The newest LAN transmission medium is fiber-optic cable which exhibits a superior performance over any of the other media.

There is an increasing need for high-performance-internode communication. The mainframe computer is being extended or replaced by department computers, workstations, and file servers. This decentralization of computers increases the amount of information that needs to be transferred between computers on a LAN. As computers get faster, they handle data at higher and higher rates.

In the above-referenced application Ser. No. 07/291,700 there is described a Local Area Network architecture based on an active star topology. Nodes attach to the hub of the star through duplex communication links. Messages transferred between nodes are passed through the hub, which is responsible for arbitration and routing of messages. Unlike the prior bus topology, or ring topology, each node of the active star responds only to those messages that are intended for it. Routing of messages is accomplished by a destination address in the header of the message. These addresses are unique to each node and provide the means by which the hub keeps the communication between nodes independent.

The active star configuration has the advantage that it increases network bandwidth. In typical networks the performance of the node interface to the network is only equivalent to the network bandwidth. This is because messages can be transferred only at the rate of the media used as the link interface from the node to the network, and the fact that only one message can be transferred at a time. Ethernet, Star Lan, FDDI, all exhibit this characteristic as they are essentially broadcast buses, in which every node has every other node's message traffic passing through it.

There is also the problem of being able to mix existing nodes that operate at relatively low speeds with more advanced nodes that operate at higher speeds.

SUMMARY OF THE INVENTION

The above objects are accomplished in accordance with the present invention through the use of a header which is appended to outgoing messages sent from a first controller to a second controller over a data link. The header contains status information as to the number of packets in the message and status of an input buffer at a controller. Similarly, the second controller places status information in the header and returns the header to the first controller. At the second controller, an input buffer connected to the data link receives and stores the message. An output mux connected to an output of the output buffer of the first controller controls data flow from the output buffer. The flow of the message data from the first controller is limited depending upon the status of the input buffer at the second controller. This feedback loop prevents overflow of the input buffer by controlling the rate at which new messages are placed on the data link.

In accordance with an aspect of the invention, the header comprises a link packet header having a packet sequence number (NNNN field), a receive packet sequence number (RRRR field), and a number specifying the number of unused buffers (SSSSS field) at the input buffer of the second node. The output mux includes first means for placing a sequence number (NNNN) assigned to an outgoing message packet in the link packet header packet sequence number field, and second means for placing a Receive Packet Sequence number (RRRR) in the link packet header receive packet sequence number field. The number (RRRR) is the sequence number of the last packet received by the input control logic. The output mux includes means in the output mux control logic for utilizing the current Message Sequence Packet Number (NNNN) and the last Receive Packet Sequence number (RRRR) to determine the number of message packets (MMMM) still in transit. The output mux also includes means for utilizing the unused FIFO Buffers field (SSSSS) and the Receive Packet Sequence number (RRRR) to calculate the number (BBBB) of available buffers at the second controller, by subtracting the number of unaccounted for packets (MMMM) from the number of Unused Buffers (SSSSS), to thereby obtain the number available buffers (BBBB).

The invention has further means for minimizing the effect of communicating between nodes with different speed links. Each controller has means for transmitting messages to the other controller in packets of a fixed byte size. A buffer mode bit in each of the controllers is set to a first state or a second state at initialization time. If the Buffer Message mode bit is set to the first state, all bytes of a message received from the link are buffered. If the Buffer Message mode bit is set to the second state a fixed number of bytes is buffered, which fixed number is equal to the fixed byte size of a message packet. The ring controller responds to the condition that the buffer has received the message and to the buffer mode bit for initiating a transfer request on the ring bus.

BRIEF DESCRIPTION OF THE DRAWINGS

The foregoing and other objects, features, and advantages of the invention will be apparent from the following more particular description of a preferred embodiment of the invention as illustrated in the accompanying drawings, wherein.

DESCRIPTION OF THE PREFERRED EMBODIMENTS

Figures 1, 3:
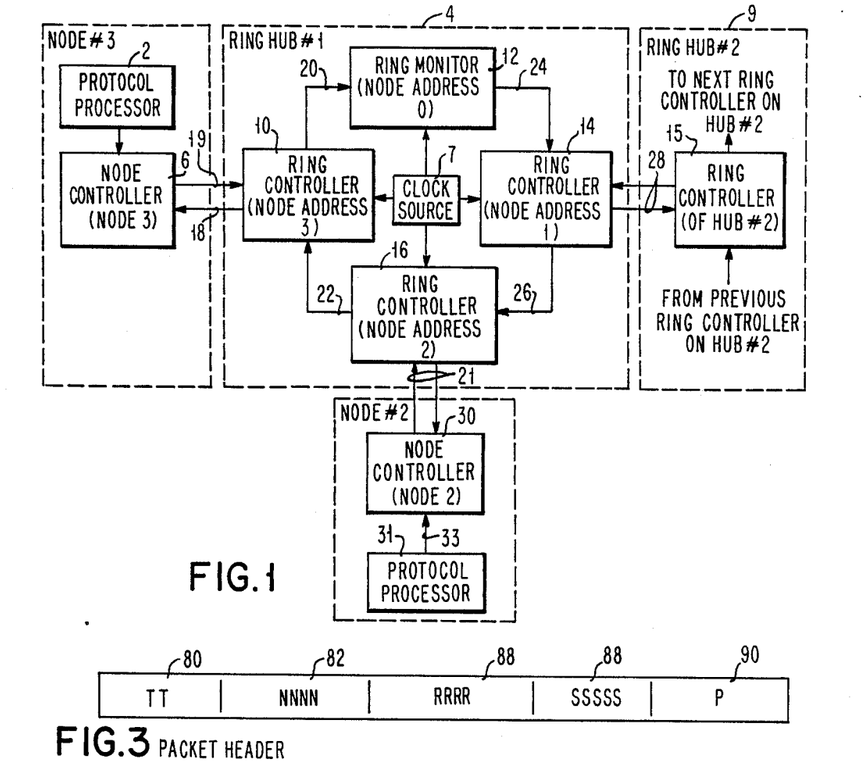
FIG. 1 is a functional block diagram of a Local Area Network in which the present invention is embodied.
FIG. 3 is a diagram of a packet header.

The the local area network in which the present invention is embodied is shown in FIG. 1. The node controller (6) is separated from its ring controller (10) by remotely connecting the node to the controller over a link interface (18, 19). The node then communicates with the controller over the link interface. Only the data associated with the individual node passes over the link. Messages flow into the Ring Controller (10) from the node (3) via its link interface (18, 19). The messages are then transferred to the destination node's Ring Controller, by way of example node controller (30), over the ring bus (20). The bandwidth required by each node is only a percentage of the bandwidth provided by the ring bus, allowing multiple messages to be carried simultaneously between pairs of nodes.

Hub Organization

The ring bus hub (4) may be connected to another hub (6) via a link interface (28). The ring bus is formed by directly connecting together cluster interface controllers (10, 12, 14, 16), described in copending application Ser. No. 07/291,640. Each controller has the Ring Controller mode selected. A Ring Controller (10) is connected to a node through its link interface (18, 19), and to two other Ring Controllers through its ring output port (20) and its ring input port (22). The bus formed by the ring controllers is a closed loop through which messages flow in a single direction around the loop. The data paths are 32-bits wide between the Ring Controllers.

Cluster Ring Bus

Information flows on the ring bus from a source node, for example node 3 to a destination node, for example node 2 within the same hub or to a node on another hub via the ring controller (14) which is attached to the ring hub (6).

Data flows from the source node (3) into its connected controller (10) and is progressively passed on to the next controllers (12, 14) until it reaches the controller (16) of the destination node (30).

Cluster Link Interface

The connection (18, 19) between the node (6) and the hub (4) is called a link. Two classes of links are accommodated, an IEEE standard 802.3 compatible link and a Cluster link. The 802.3 compatible link allows a hub to interface to a single, IEEE standard 802.3 node. The Cluster link, shown in FIG. 1, requires a node using a cluster interface controller (CLIC) with the Node Controller mode selected in the node along with cluster interface controller (CLIC) with the Ring Controller mode selected in the hub. The CLIC is more fully described in copending application Ser. No. 07/291,640. The Cluster link establishes high speed, full duplex operation with full message buffering and flow control. The 802.3 link uses the standard 10 Mbit, half duplex interconnection of the IEEE 802.3 standard. The difference in speeds between these nodes and with the ring bus speed requires that the node controllers have a way of matching speed with the ring controllers. Speed matching is described subsequently under the heading "Speed Matching Between Source and Destination Links".

The physical connection for the link interface uses off-the-shelf media interfaces, such as the 82501 Manchester encoding/decoding component for a serial interface and TAXI FDDI interface components for a parallel interface. These components have different signaling and data format requirements, requiring specific I/O interfaces for interconnection. Both interfaces when used in accordance with the teachings of the present invention operate at higher speeds than currently is possible with prior art components.

Flow control between the two CLICs at each end of the link is maintained through transmission of control information in both directions. Messages are formed into packets for transmission on the link and a header carrying control information is appended to the message. The header is generated by the source CLIC and removed by the destination CLIC receiving it on the other end of the link.

Message packets are transmitted simultaneously in both directions over the full duplex link. Control information for messages transmitted in one direction are piggy-backed on packets flowing in the opposite direction.

Flow control is used to prevent overrun of the Input FIFO in the destination CLIC that is receiving the message, while allowing maximum use of the available bandwidth. The mechanism minimizes the impact of links spanning long distances or which are operating at very high performance levels. In both of these cases, significant amounts of a message can be in transit on the link at any instant relative to the available buffer size. The control information and smaller packet sizes eliminates the effect of the pipeline on bandwidth usage and latency.

Message Flow

Figure 2:
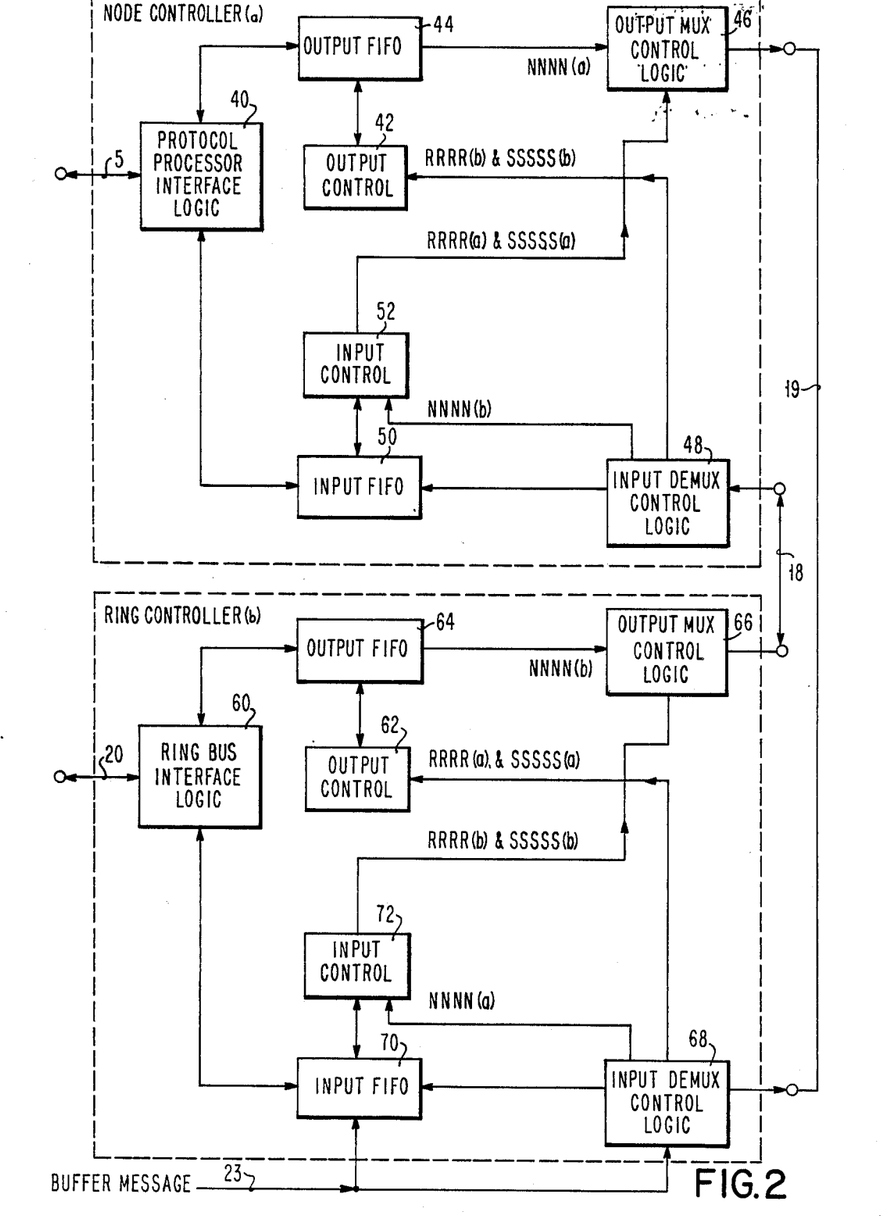
FIG. 2 is a functional block diagram of a link interface between two interface controllers shown in FIG. 1.

The relationship between two CLICs (8 and 10), their media interfaces (input and output control logic) and the media (link 18, 19) is illustrated in FIG. 2. The link is symmetrical with a feedback mechanism to regulate message flow so that the FIFO buffers do not overflow. Control messages are mutiplexed with output data. On the receive side, control messages are separated from the received data. Control messages are not transferred to the protocol processor. Messages are transferred from the protocol processor (2) of FIG. 1 to the node controller (6). The message is received at the protocol processor interface (40) and output FIFO (42) of the node controller and transferred to the output MUX control logic (46) where message packets are formed and header information is appended. Message packets are transferred from the output FIFO (44) under control of the output control MUX (46) for transmission onto the link (19). At the other end of the link (19), in ring controller (10), the message packet is received at input DEMUX control (68) where the header is separated from the received data and sent to the output control logic (62) to be used for feedback control. The data packet is sent to the input FIFO (70) and from there under control of input control logic (72) to the ring bus interface logic (60). The message packet is inserted onto the ring bus in accordance with the protocols set forth in copending patent application Ser. No. 07/291,544.

Data Messages Packets

Messages of arbitrary length, for example, up to a maximum of 4.5K bytes, are sent through the Cluster. A message is transferred to or from the CLIC (6) at the node # 3 as a contiguous, ordered block of data. The Cluster maintains that relationship at the nodes, but forms the message into packets for transmission over the link (18, 19) and from ring controller (10) to other ring controllers on the ring bus. All packets are moved, in order, on the same path through the Cluster network. Packets from other messages are not interspersed between the packets comprising the original message.

In the preferred embodiment, message packets transferred over the link (18, 19) range from 2 to 258 bytes in length. Each packet is composed of a 2 byte header appended to data bytes comprising the message. A packet without data is used to transfer control information from the input control logic (52). Messages are divided into 256 byte segments for transmission on the link. If a message cannot be evenly partitioned, the last segment is less than 256 bytes, with actual length dependent on the total message length.

Link Packet Headers

Refer to FIG. 3. A 16 bit header is appended to the beginning of every packet before transmission on the link (18, 19) by the CLIC (6). The packet header identifies the information contained in the packet, a sequence number if the header is part of a message, and control information for the Output Logic at the opposite end of the link. Packets without message data are sent to transfer control information when there are no packets with message on which to attach the header. These control packets are initiated by a simple counter as an "I am alive" message when the link is idle.

The Packet Designator (TT) bits (80) identify the contents of the packet. 00 is a packet in a message being transmitted. 01 is the last or only packet in the message. A packet designator of 11 identifies a null packet, which has no data. The NNNN field (82) is a packet sequence number (0-15). The RRRR field (86) is a receive packet sequence number (0-15). The SSSSS field (88) is a number specifying the number of unused input FIFO packet buffers (0-32). The P bit (90) is an odd parity bit used for error detection.

Message Packet Sequence

Figure 7A:
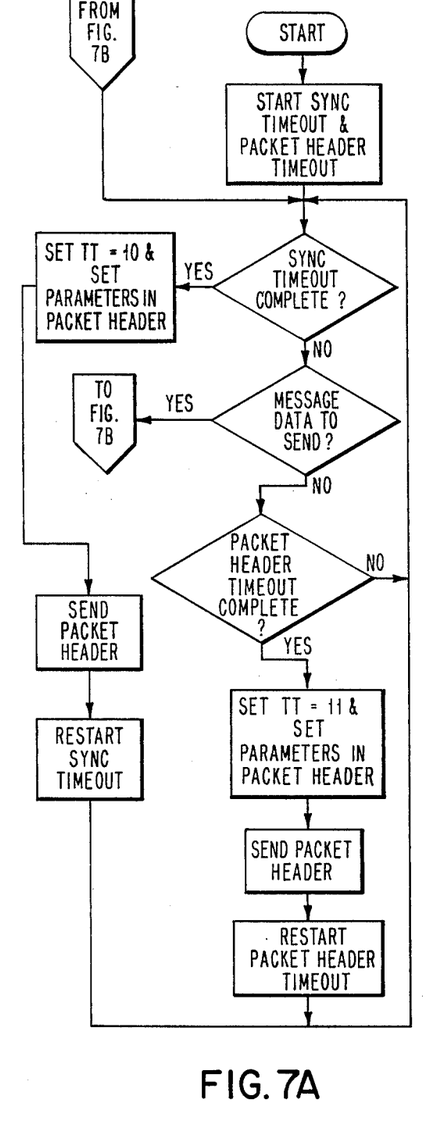
FIGS. 7A and 7B are a flow chart of the output control logic shown in FIG. 2.
Figure 7B:
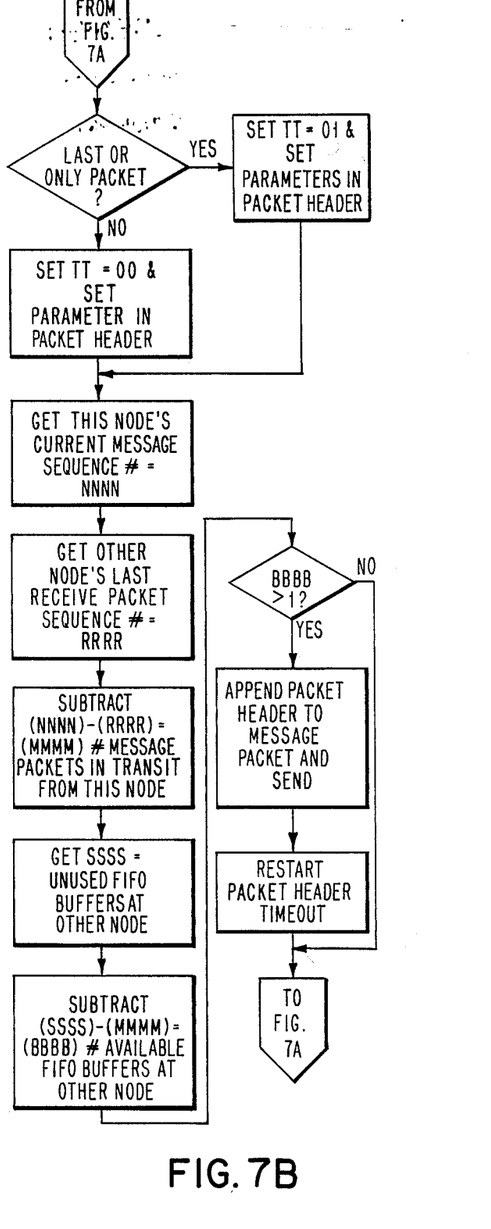

Refer to FIGS. 7A and 7B which are flow diagrams of the logic within the output mux control logic (46) of FIG. 2. Numbers are assigned by the output mux control logic (46) to every outgoing message packet. The numbers are assigned in sequence, starting at 0 and ending at 15. Once 15 is reached, the sequence begins again at 0. The sequence numbers are independent of message boundaries, identifying only packet sequencing. The Receive Packet Sequence number (RRRR) identifies the last packet received by the Input Logic (52 or 72) of the CLIC (6 or 10) that is sending the Receive Packet Sequence. The Output mux control Logic (46 or 66) of a CLIC (6 or 10) uses its current Message Sequence Packet Number (NNNN) and the last Receive Packet Sequence number (RRRR) to determine the number of message packets (MMMM) still in transit or unaccounted for.

Refer again to FIG. 2 and FIG. 7B. The Unused FIFO Buffers field SSSSS (b) identifies the number of 256 byte buffers in the Input FIFO (70) of the destination CLIC (10) that have no data in them. The Receive Packet Sequence number RRRR (b) from the ring controller (b) and Unused FIFO value SSSSS (b) from the ring controller (b) are used to calculate the number (BBBB) of available buffers at the ring controller (b). The Output mux control Logic (46) of node controller (a) uses its current Message Sequence Packet Number NNNN (a) and the last Receive Packet Sequence number RRRR (b) from the header received from ring controller (b) to determine the number of unaccounted-for message packets (MMMM) still in transit to ring controller (b). By subtracting the number of unaccounted for packets (MMMM) from the number of Unused Buffers SSSSS (b), the available buffers (BBBB) at ring controller (b) is determined. The Output mux control logic (46) uses this information to prevent sending packets that will cause the Input FIFO (70) at the destination CLIC (10) to overflow. The node controller (a) returns a packet header to the ring controller (b) for a similar speed control at ring controller (b). The header is made up of the Receive Packet Sequence number RRRR (a) which identifies the last packet received by the Input control (52), the SSSSS (a) field which identifies the number of available 256 byte buffers in the Input FIFO (50) and the current Message Sequence Packet Number NNNN (a) from the output control (42).

As shown in FIG. 7A, a packet header with the designator of 10 is a resynchronization packet. If the sequence numbers lose synchronization between the two ends of the link and the Link Timeout period is exceeded, this packet is used to reestablish transmission. The Resync packet is sent only after the output and input logic have failed to synchronize for a predefined timeout period.

Bit Level Synchronization on the Link

The link (18, 19) consists of two independent, unidirectional connections that can both transmit simultaneously. Bit level synchronization is maintained over the link by always transmitting a sync code when the link is idle. The sync code is determined by the Physical Layer implementation chosen. New packets are sent at the first available boundary between sync codes and are recognized by the fact that it is not a sync code. The ending delimiter is the resumption of sync codes.

Sync codes will not be transmitted as a fill character in the packet, as in some synchronous protocols. It is always guaranteed that the complete packet is buffered before it is transmitted on the link, eliminating the need for sync fill. Continuous transmission keeps the link synchronized and reduces the starting delimiter latency to a maximum of 1 sync period and the minimum time between packets to 1 sync period.

Cluster Network Header

Figure 4:
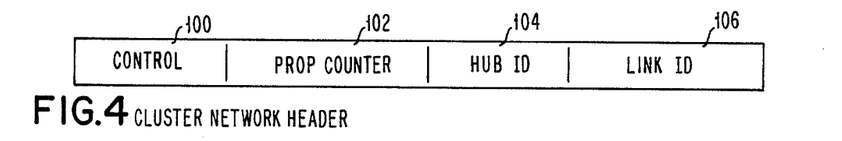
FIG. 4 is a diagram of a cluster network header.

Refer to FIG. 4. The Cluster Network Header is a 4 byte field appended to the beginning of every message sent on the Cluster network. The header is used by the network and removed before the message is passed on to the destination node.

The header is generated in the Node Controller of the message source, or for the 802.3 interface the header is generated in a Ring Controller. The Cluster header contains the native mode destination address, an 8-bit Hub ID (104) and an 8-bit Link ID (106), a Propagation Counter (102), and control field (100).

Physical Media Interfaces

The CLIC operates in a synchronous physical environment, whether it is configured as a Ring Controller or a Node Controller. The Ring Controllers in a hub all receive clock signals from the same synchronous clock (7), which drives the internal logic and provides a timing reference for the ring bus. A Node Controller uses the bus clock to drive the internal logic and to provide a reference for the protocol processor I/O Bus timing. The link interface (18, 19) is, however, asynchronous to the internal logic of the CLIC and may operate at a substantially greater frequency than the internal logic.

The media interface is responsible for providing the synchronization signals for outgoing messages from the CLIC and synchronization for incoming signals. For example, the 82501 provides a transmit clock to the CLIC (MAC) that the CLIC uses to time its outgoing data. The 82501 encodes the data and passes it on the line driver component. On receiving data, it decodes the data from the input signal and supplies it with a receive clock to the CLIC.

Local Address Format

Figure 5:
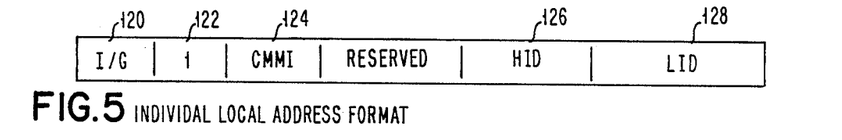
FIG. 5 is a diagram of the individual address format.

The local address format is shown in FIG. 5. The I/G field (120) selects either the group or individual address function. The CMMI field (124) is a Cluster defined field used to identify network control functions. A zero value in the field indicates that the message is to be handled normally. A non-zero value identifies a special function to be performed by the CLIC selected by the hub ID field (126) and the link ID field (128).

Cluster Management Messages (CMMs) are addressed directly to a Ring Controller and are used to manage functions in the network that cannot be directly handled by the hardware. Examples are network mapping, initialization of routing functions, diagnostic evaluation, and performance monitoring. Ring Controllers recognize the message as a CMM and treat it as a normal message unless it is addressed to them. If addressed to the Ring Controller, the function defined by the CMMI field are performed. CMMs are described subsequently.

Performance and Flow Control

The Cluster architecture is designed to accommodate a wide variety of media transmission rates and multiple hub configurations in a single network. The latency of a message transmission between any two nodes is dependent on many factors.

Node-to-Node Latency in a Single Hub Network

Message latency is defined as the difference between the time the source node begins transmission of the message and the time that the last bit is received by the destination node. The total latency is composed of the sum of the transmission time for the message on both the source and destination links minus the overlap period. The overlap period is dependent on traffic on the Ring Bus, blocking at the destination and whether or not speed matching between links has been employed. There may be no overlap, which will increase the latency beyond the sum of the two link latencies.

Link Delays

Refer to FIG. 1. Both the link (18, 19) between the source node controller (6) and its associated ring controller (10) and the link (21) between the destination ring controller (16) and its associated node controller (30) must be traversed by a message as it is transmitted between node 2 and node 3. The delay time introduced by a link is dependent on the transfer rate of the link.

The latency of the message transfer on the Ring Bus is completely independent of the speed of the links, depending only on the message length when there is no interference. It can be seen that a message of 256 bytes or less will always have delays equal to at least the sum of the source and destination link plus the hub delay. Longer messages will overlap their source and destination link transfer times, reducing the percentage of the delay relative to the source link transfer time. The need to fully buffer a packet before transferring it on the ring and the initial Request/acknowledge and first packet transfer, determine the minimum additional latency of any message.

Speed Matching Between Source and Destination Links

In accordance with the present invention, transfer rates between source and destination links having different speeds are matched such that only those nodes requiring the higher rates have to pay the interface and media costs. Examples of this are workstation networks with single file servers, or connections between Cluster hubs, such as shown in FIG. 1. In these cases many lower speed message streams are multiplexed into higher bandwidth data streams that are transferred over the higher speed link of the server. The reverse occurs when the server transmits messages, with the high bandwidth stream from the server being demultiplexed to many lower speed links for distribution to the workstations.

Speed Matching Delays

The large FIFOs and message packets provide the means to accomplish efficient speed matching with minimal overhead. The Input FIFO (70) of the Ring Controller (10) associated with the source node (i.e., node 3) is used to collect the complete message from the node over the link (18, 19) to that node. The message is then transferred on the ring bus (20) to the destination at the maximum transfer rate allowed by the Ring Bus. If there is no other traffic and there is not another message buffered in the input FIFO of the destination Ring Controller, the transfer on the Hub is a transfer from one FIFO buffer to another. The destination Ring Controller (16) begins transmitting the message over the link (19) to the destination node (node 2) as soon as begins receiving the first packet in its input FIFO.

The total latency from source to destination is the sum of the source and destination link transfer times plus the Request/Ack time and first packet transfer time of the message on the ring bus.

The latency actually improves in the reverse direction, as the complete message does not have to be collected in the Ring Controller before it is sent to the destination. The higher transfer rate insures that the source Ring Controller will always be ahead of the destination Ring Controller.

Buffer Message Mode

The buffering of a complete message before it is transferred on the Ring Bus is a mode option that is chosen at initialization time by setting the buffer message mode bit. If the Buffer Message mode bit input (23) is asserted on the Link Interface (68) of the Ring Controller at Reset Time, all messages received from the node controller (a) on link (19) are completely buffered at the input FIFO (70) of the ring controller (b) before they are sent on the ring bus (20). Otherwise, only 256 bytes will be buffered before the data transfer is initiated on the ring bus.

FIFO Buffering

The Input and Output FIFOs minimize the effect of communicating between nodes with different speed links. When a message is received from a low speed node, it is buffered completely in the source Input FIFO. When the actual transfer between Ring Controllers occurs, it happens at the highest possible rate of the Ring Bus. Once the message is in the destination Ring Controller's Output FIFO, it is transferred to the attached node at the maximum rate of the link.

The ability to completely buffer a maximum size message in both Ring Controllers decouples the speed of the slow link from the fast link. Messages flowing from the higher speed link to the lower speed link are decoupled in a similar fashion. However, if multiple maximum size messages from the node with the higher speed link are sent to the lower, there is the potential of blocking. This occurs when the destination Ring Controller's Output FIFO is filled and cannot accept any more data until some data is sent from the output FIFO to the destination node. The transfer rate of the high speed node is reduced to that of the low speed until the source Ring Controller's FIFO is cleared of the messages for the low speed node.

Buffering Strategies for Different Speed Links

Using message packets on the Ring Bus provides for reduced latency when the link speed of the destination is equal to or less than the link speed of the source link. The opposite is true when sending from a Ring Controller attached to a low speed link to a Ring Controller attached to higher speed link. In this case the destination Ring Controller must wait for more packets from the ring bus after sending each packet on the link to the destination node. The Buffer Message mode bit corrects this situation.

The solution works well for every case except for two nodes with slow links. These nodes buffer their messages before placing them on the hub, which induces a delay equal to two links for every transfer between them. The message cannot be placed on the hub before it has been buffered in the source Ring Controller, and that time will then be added to the time the message spends on the destination link.

The determination of whether to use the Buffer Message mode must be based on application. If the majority of communication is from low speed nodes to high speed nodes, the solution is obvious: set the Buffer Message mode on all low speed links. In other situations, the traffic and network requirements must be analyzed before a decision is made.

Multiple Hub Latencies

The additional latency in a message transmission that crosses multiple hubs comes from the delay of the additional links between the source and destination and the delay encountered in the intermediate hubs. The minimum and maximum delays for the single hub cases apply to the intermediate hubs as well.

Intermediate delays are calculated using the link speed of the hub-to-hub link to obtain the packet buffering time in Ring Controller of the intermediate hub. That is added to the packet transfer time on the hub to obtain the additional delay. This additional delay can be viewed as decreasing the overlap period of the source and destination links. Minimum hub delay is constant and can be amortized over longer messages. In longer messages hub delay is a lower percentage of the total time even though the delay is constant. The unloaded, unblocked latency is relatively low. Very heavy traffic or blocking at connecting links or destinations will adversely affect the latency. Hub-to-hub links of higher performance than node-to-hub links will improve latency only under certain conditions. In the unloaded, unblocked case, the transfer rate is set by the node-to-hub link if the message is not completely buffered before being placed on the hub. Packets can be collected in the first Ring Controller in the path only as fast as the message is received from the link. This paces all following transfers unless the message is blocked at some point. Messages smaller than the packet size will also see the improvement. They are a completely independent packet and are transferred as a unit, thereby transferring at whatever is the data rate of the link. Blocking of the message at any point in its path also allows the message to take advantage of the increased speed. In these cases, the message is waiting in a FIFO and ready to go at the maximum transfer rate of the Ring Bus or the link.

IEEE 802.3 Standard Node Compatibility

The 802.3 Link Interface connects directly from a Cluster hub to an 802.3 node. The 802.3 link provides a bridge to the Cluster from existing systems, allowing 802.3 nodes to interface directly to Ring Controllers in the hub through standard connections. The full bandwidth of the link is available to the node, just as in the native Cluster connection.

Speed Matching

The 802.3 10M bit/second links are the slowest links in the Cluster. Communicating with nodes attached to higher speed links can adversely affect the higher speed node's performance. The Buffer Message Mode bit mechanism ensures that all message sent to the hub by the 802.3 node are completely buffered before transfer on the hub.

802.3 Link Flow Control

Links utilizing CLICs at both ends of the link have the fine-grained flow control mechanism described previously incorporated into the full duplex communication between them. The 802.3 link is half-duplex with arbitration between nodes for the media based on collision detection, and flow control is handled between nodes at the message level. If the Ring Controller is interfaced directly to an 802.3 node, the input FIFO could easily be overflowed in some situations. The node can transmit many messages to the ring controller, while the Ring Controller might be blocked from transmitting them to the destination. The flow control in the native link prevents this from occurring.

The 802.3 Link Interface prevents overrun by forcing collisions on the link when the FIFO is full. This causes the node to back-off and attempt to transmit again later. Overrun is avoided, the node treating it as a normal arbitration collision and handling it accordingly.

The Ring Controllers policy for transmitting on the link is different than for the normal 802.3 node. The IEEE standard provides for random retry and back-off to allow all nodes access to the network. The Ring Controller will never backoff, instead it will send repeatedly until it wins the arbitration. With only two sources on the link, the elaborate policy can be circumvented by one source without any problem. There is a 50-50 chance that on retry the node will attempt to transmit again. The Ring Controller always will transmit again, winning 50% on the first try. The node will back off further on the second try, which will guarantee that the Ring Controller will win on the second try. The flow is biased in favor of the Ring Controller such that messages are always removed from the network at the maximum possible rate. This helps to improve average latency by reducing delays due to blocking. When a FIFO in a Ring Controller is full, it blocks any additional data from being sent by a source Ring Controller, adding to the latency of the message being held up.

Because the performance of an 802.3 link is the slowest in the network, it is desirable to maximize the flow out of the network rather than into the network.

Message Size

The 802.3 standard limits the maximum message size to 1.5 K bytes, while the Cluster is designed to handle up to 4.5 K bytes. It is the node's responsibility to be aware of the destination of a message and adjust the size accordingly.

Broadcast messages are limited to 1.5 K bytes for all sources. Again, it is the responsibility of the nodes to enforce the limitation. In many cases the message may get truncated but the only detection is from a bad CRC at the destination. The maximum of 1.5 K bytes maintains compatibility between nodes since broadcast message are sent to all nodes. The 1.5 K byte limit also reduces the buffering requirement for the Broadcast buffer, thereby reducing the size of the CLIC.

Network Management

Cluster networks are capable of being interconnected, employing several hubs within the larger network. Provision for managing the various nodes and hubs, performance monitoring, and diagnosing malfunctions is provided in the basic structure of the present invention. Access to these capabilities is provided through Cluster Management Messages (CMMs).

Each node logically views the Cluster as many direct connections to all other nodes. The underlying mechanisms for moving messages between nodes are incorporated within the CLIC logic. CMMs open up that logic to network management software so that various operations and be performed such as resetting components and setting specific registers and mode states within a CLIC.

Cluster Management Messages

Figure 6:
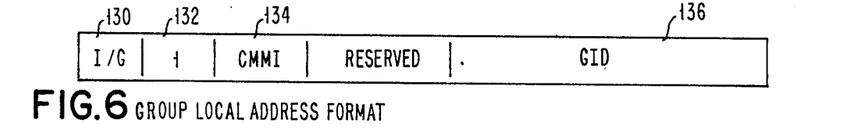
FIG. 6 is a diagram of the group local address format.

Cluster Management Messages are specified in the CMMI field in the Local Address format (FIGS. 5 AND 6). Both group and individually addressed CMMIs are supported. The first 8 bits, which include the CCMI field, of the local address (FIG. 4 or 5) are copied into the Control Field (100) of the Cluster Network Header of FIG. 4. A CMM is recognized by a ring controller examining the Cluster Network Header which is appended to all messages transmitted. CMMs are addressed to a Ring Controller, not to a node. The Ring Controllers have unique, network wide address identifications and can be accessed unabiguously.

The only group addresses permitted specify those addresses recognized by Ring Monitors, whose addresses are ignored by all other Ring Controllers. The CMM will not be passed on to the nodes. The normal Broadcast Tree is used to disperse the group CMM.

A summary of the available CMM types is presented below:.

| CMMI | |
|---|---|
| | Individual CMMI Functions |
| 1 | Reset attached hub, if Ring Monitor (Link ID = 0) all other Ring Controllers will ignore this CMM. |
| 2 | Return mode and address values to address provided with CMM |
| 3 | Load Ring Bus Recognizers with values provided in CMM |
| 4 | Load Broadcast Enable with value provided in CMM |
| 5 | Return Performance Monitor register values to address provided in CMM. |
| 6 | Return Performance Monitor register values to address provided and clear registers. |
| 7 | Initialize Performance Monitors with values contained in CMM |
| 8 | Return message embedded in this CMM to source. (Message is sent on the side of Ring Controller from which it was received, ie link or ring bus.) |
| 9 | Translated address returned from Ring Monitor Module. |
| 10-62 | Reserved |
| | Group CMMI Functions |
| 1 | Reset attached hub after message is completed. |
| 2-62 | Reserved |
| | Common CMMI Functions |
| 0 | No function, normal message |
| 63 | Escape- go to message body for function to be performed. |
| — | Not currently used. |

CMM Usage Model

CMMs fall into three categories:
1. CMMs that alter Ring Controller state.
2. CMMs that return Ring Controller state to requestor.
3. CMMs that send messages embedded in CMM to a specified destination.

The first category of CMM, allows the Ring Controllers to be initialized. The hardware provided reset/initialization sequence assigns native Cluster addresses to all Ring Controllers and reads hardwired mode values. This provides for basic operation of the hub, but not the hub-to-hub routing algorithms or variants on performance monitoring. These values are set using the first category of CMMs.

The second category of CMM is used to determine the various modes and chart the network. The registers of each Ring Controller contain information identifying the mode options of the link interface associated with the ring controller, as well as the identity of the hardware at the node. From this information, a Network Manager can determine the nodes and hubs attached to a particular hub. By setting up the Hub ID recognizers it can the examine all of the hubs attached to that hub and so on until the complete network is mapped.

The final category of CMM "loop-back" diagnostic functions to be initiated. These CMMs contain a complete message including address and cyclic redundancy checking (CRC) bits embedded between the destination address and CRC of the CMM. That message is extracted by the Ring Controller and sent to the designated node. This allows a single node to completely check all hubs, hub-to-hub links and its own link without actually setting up communication with another node.

While the invention has been particularly shown and described with reference to preferred embodiments thereof, it will be understood by those skilled in the art that the foregoing and other changes in form and detail may be made therein without departing from the scope of the invention.

What is claimed is:

1. For use in a local area network having a first controller (6) within a first node (node #3) and a second controller (10) within a ring hub (ring hub #1), said second controller (10) including an input buffer (70), said second controller (10) including an output mux (66) for sending a second-node header to said first controller (6), said second-node header containing second-node receive logic status information as to the status of said input buffer (70) at said second controller, the improvement in said first controller (6) comprising:
   a receive data link (18, 48);
   a transmit data link (46, 19);
   an output buffer (44);
   an input buffer (50);
   an output control (42) connected to said output buffer (44); and,
   an input control (52) connected to said input buffer (50);
   said transmit data link (46, 19) including an output mux control logic (46) connected to an output of said output buffer (44);
   said receive data link (18, 48) including an input demux control logic (48) connected to an input to said buffer (50);
   said input control (52) including first means (FIG. 7A) for transferring first-node receive logic status information to said output mux control logic (46), said first-node receive logic status information containing information as to the status of said input buffer (50) of said first node;
   said output mux control logic (46) including second means (FIG. 7B) for combining said first node receive logic status information from said input control logic (52) with message data from said output buffer (44) to form a first-node header and for placing said first-node header on said transmit data link (19) to thereby transmit said first-node receive logic status information along with said message data to said second controller (10);
   said input mux control logic (48) being connected to said output control (42);
   said input mux control logic (48) supplying said second-node header received from said second controller (10) to said output control (42);
   said output control (42) including third means for limiting the flow of said message data from said output buffer (44) depending upon the status of said input buffer (70) at said second controller as specified by said second-node receive logic status information contained in said second-node header, to thereby prevent overflow of said input buffer (70) by controlling the rate at which new messages are placed on said transmit data link (19, 46).

2. The combination in accordance with claim 1 wherein said second-node receive logic status information comprises a link packet header having a packet sequence number (NNNN field 82), a receive packet sequence number (RRRR 86), and a number specifying the number of unused buffers (SSSSS field 88) at said input buffer (70) of said second controller (10).

3. The combination in accordance with claim 2 wherein said output mux control logic (46) includes:
   fourth means for placing a current packet sequence number (NNNN) assigned to an outgoing message packet in said packet sequence number field (82) of said link packet header, and
   fifth means for placing a Receive Packet Sequence number (RRRR) in said receive packet sequence number field (86) of said link packet header, said Receive Packet Sequence number (RRRR) being the sequence number of the last packet received by said input buffer (70) of said second controller (10) as specified in said second-node header received from said second controller (10).

4. The combination in accordance with claim 3 wherein said output mux control logic (46) includes:
   sixth means for utilizing said current Message Sequence Packet Number (NNNN) and said last Receive Packet Sequence number (RRRR) to determine the number of message packets (MMMM) still in transit.

5. The combination in accordance with claim 3 wherein said output mux logic (46) includes:
   seventh means for utilizing said number specifying the number of unused Buffers (SSSS) at said input buffer (70) of said second controller (10) and said Receive Packet Sequence number (RRRR) to calculate the number (BBBB) of available buffers at said second controller (10), by subtracting said number of message packets (MMMM) still in transit from said number of Unused Buffers (SSSS), at said input buffer (70) of said second controller (10).

6. Apparatus for communicating between nodes with different speed links comprising:
   a ring bus (20, 22);
   a ring controller (b) attached to said ring bus;
   a node controller (a);
   said node controller (a) attached to said ring controller (b) by means of a link (18, 19);
   said ring controller having means (60) for transmitting messages to another controller on said bus (20, 22) in packets of a fixed byte size;
   a buffer message mode bit input line (23) in said ring controller (b); and, means (68) operative upon the condition that said Buffer Message mode bit input line (23) is asserted for causing all bytes of a message received from that link to be buffered (70) and further operative upon the condition that said Buffer Message mode bit input line (23) is not asserted for causing a fixed number of bytes to be buffered, said fixed number being equal to said fixed byte size.

7. For use in a local area network having a first controller (6) and a second controller (10), said second controller (10) including means (66) for sending a second-node header to said first controller (6), said second-node header containing second-node status information as to the status of an input buffer (70) at said second controller, the method comprising the steps of:

(A) transferring first-node receive logic status information to said output control means (42), said receive logic status information containing information as to the status of said input buffer (50) of said first controller (6);

(B) combining said first node buffer (50) status information with message data from said first controller (6) to form combined information including a first-node header;

(C) transmitting said first-node header to said second controller (10);

(D) receiving said second-node header at said first controller (6); and, (E) utilizing said second-node status information as to the status of said input buffer (70) at said second controller, to control the rate at which new messages are placed on said transmit data link (19) from said first buffer (44) depending upon the status of said input buffer (70) at said second controller (10).

8. The method in accordance with claim 7 wherein said first-node header and said second node header each include a packet sequence number (NNNN field 82), a receive packet sequence number (RRRR field 86), and a number specifying the number of unused buffers (SSSSS field 88) at the input buffer of the respective controller, said method further comprising the steps of:

(F) placing a sequence number (NNNN) assigned to an outgoing message packet in said first-node header packet sequence number field (82), and (G) placing a Receive Packet Sequence number (RRRR) in said first-node header receive packet sequence number field (86), which number (RRRR) is the sequence number of the last packet received from said second controller (10) as specified in said second-node header.

9. The method in accordance with claim 8 further comprising the steps of:

(H) utilizing said current Message Sequence Packet Number (NNNN) of said first-node and said last Receive Packet Sequence number (RRRR) in said second-node header to determine the number of message packets (MMMM) still in transit.

10. The method in accordance with claim 8 further comprising the steps of:

(H) utilizing said packet sequence number (NNNN) of said first node and said Receive Packet Sequence number (RRRR) in said second-node header to calculate the number (MMMM) of messages in transit from said first node to said second node; and, (I) calculating the number (BBBB) of available buffers at said second controller (10), by subtracting the number of messages in transit (MMMM) from the number of Unused Buffers (SSSSS) at the input buffer of said second controller, to thereby obtain the number available buffers (BBBB) at said second controller.

* * * * *